Figure 1:
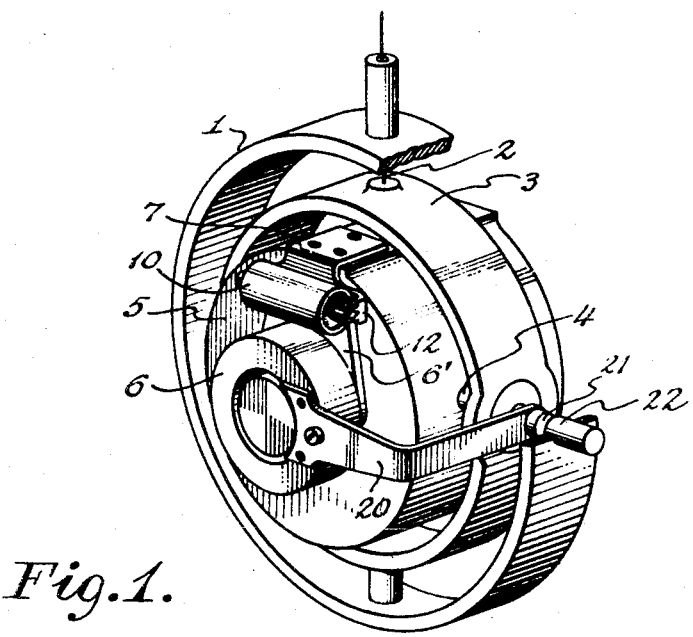

Nov. 11, 1958   L. F. CARTER   2,859,624
VISCOUS DAMPER
Filed July 1, 1954

INVENTOR
LESLIE F. CARTER
BY
Herbert H. Thompson
ATTORNEY

United States Patent Office 2,859,624
Patented Nov. 11, 1958

2,859,624
VISCOUS DAMPER

Leslie F. Carter, Leonia, N. J., assignor to Sperry Rand Corporation, a corporation of Delaware Application July 1, 1954, Serial No. 440,586

7 Claims. (Cl. 74—5.5)

This invention relates to maintaining the damping coefficient of a viscous damper at a predetermined value regardless of temperature changes which usually cause variation in the viscosity of the liquid. More especially, it relates to viscous dampers employed on gyro compasses or other sensitive gyroscopic instruments in which it is also important that the balance of the device not be disturbed by movements of the liquid due to temperature changes, and that the liquid container be sealed so that the amount of liquid will not vary from time to time.

In particular, my invention constitutes an improvement in viscous dampers employed to damp a control pendulum used on a gyro compass. Such a pendulum is shown in my prior application S. N. 350,634 for Gyro Compasses, filed April 23, 1953, now Patent Number 2,811,786 (see especially Figs. 7 and 8 and the dash pot dampers at 51, 52 and 53). As explained in said prior application, the damping or delaying factor is both critical and important since it is so designed that the pendulum does not respond to the short period roll and pitch accelerations of the ship (on the order of a few seconds) or at least does not respond in phase with such acceleration so that intercardinal or quadrantal rolling errors are prevented. On the other hand, the damper does not interfere with the action of the longer period acceleration forces due to the change in speed or course of the ship (on the order of a minute or two and known as ballistic deflection) or to the much longer period of oscillation about the meridian (85 minutes). Said damper, therefore, may be termed a time delay or lag device. As the first step toward accomplishing my purpose of maintaining the damping coefficient or viscous drag or lag constant, I select a damping liquid of high viscosity which has a fairly flat temperature viscosity characteristic, that is, the viscosity of which varies a minimum amount with temperature changes. A satisfactory liquid for this purpose has been found to be a Dow-Corning silicone, rated at 800,000 ckts. at 25° C. This fluid viscosity over a range of 110 degrees centigrade, varies over a ratio of only 3:1 as compared to a ratio of 2500:1 for a petroleum base hydraulic transmission fluid, but even this variation materially affects the damping coefficient, the adverse effect of which I propose to eliminate by my invention by decreasing the clearance between the members within the liquid as the temperature rises.

Figure 2:
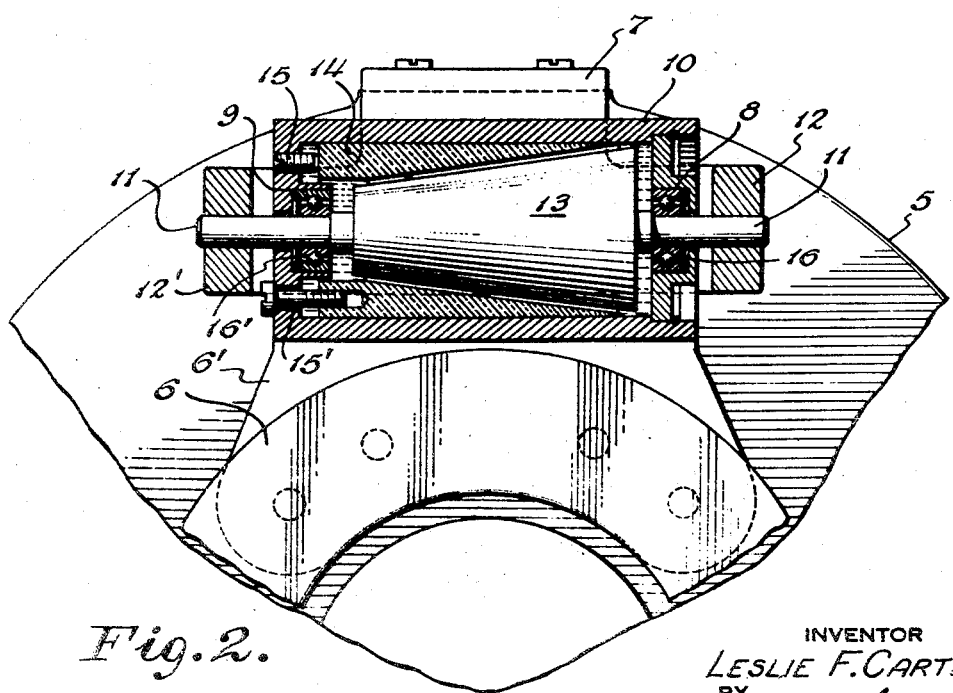

Referring to the drawings,

Fig. 1 shows a perspective view with parts broken away of my improved viscous damper applied to the pendulum controller of a gyro compass resembling the gyro compass shown in my aforesaid application for Letters Patent; and Fig. 2 is a vertical section on an enlarged scale through my improved damper, the adjacent parts of the compass being shown in elevation.

Fig. 1 represents a simplified form of a gyro compass for dirigible craft including the follow-up or phantom ring 1 from which is suspended the vertical ring 3 on the filar 2. A rotor case 5 is supported on a horizontal axis 4 within the vertical ring 3. The ring 3 has freedom about a vertical axis. For simplicity, the usual follow-up or azimuth motor which drives ring 1 and the many other usual compass parts not related to this invention are omitted from the drawings.

Meridian seeking properties are imparted to the compass by a pendulum shown in the form of a heavy ring 6 secured to supporting plate 6', which in turn is journalled in antifriction bearings 8, 9 on a cross shaft 11 fixed in ears 12, 12' on a plate 7 secured to the gyro casing 5. For this purpose, plate 6' has at its top a hollow cylinder 10, in the two ends of which are fixed the antifriction bearings 8 and 9 which journal the cylinder and weight 6 on the shaft 11. The interior of the cylinder 10 is completely filled with a viscous liquid preferably of high viscosity and a flat temperature coefficient having the characteristics stated above. Fixed to the stationary shaft 11 within cylinder 10 is a member 13, preferably in the form of a cone, which therefore does not turn or move with the pendulum 6. Also within said cylinder 10 is shown a liner preferably in the form of a beveled sleeve 14 which is uniformly spaced a small distance from the cone 13 in normal operation.

Means may be provided to relatively adjust the positions of the cone 13 and sleeve 14 so as to vary the clearance between the same to secure the proper damping coefficient. For this purpose there is shown a plurality of push screws 15 threaded in one end of the cylinder 10 and bearing at the inner ends against one end of sleeve 14, a plurality of pull screws 15' which are threaded into the same end of sleeve 14 so that the conical sleeve may be moved to the right in Fig. 2 to decrease its clearance with the cone 13 by advancing the screws 15 and 15', while the sleeve may be moved to the left by retracting the same. It is to be understood that both sets of screws are adjusted together so that the sleeve is clamped against axial shift in the cylinder.

In order to compensate for the decrease in viscosity that occurs if the temperature liquid is increased (and vice versa), I propose to make use of the known fact that the damping effect of a viscous liquid on two relative movable members is dependent not only on the viscosity of the liquid, but upon the proximity or clearance between the two members, the viscous drag varying inversely as a function of the clearance between such two members. I, therefore, propose to compensate the thermal change in viscosity of the liquid by selecting dissimilar materials for the two members, that is, for the cone and the sleeve, so as to alter the fluid gap between the members due to the differential diametric expansion of the same. Thus, I choose a material for the cone which has a higher coefficient of expansion than that of the adjacent beveled sleeve. Thus, if I employ the above stated Dow-Corning silicone as the viscous liquid, I would select two materials for the cone and sleeve which would relatively have an expansion differential ratio of 3:1. Two materials found suitable are an alloy known as "Dural" for the cone and glass for the sleeve, which combination offers an expansion ratio of about 3:1 which is the same as the silicone mentioned above.

It may also be observed that leakage of the fluid from the cylinder is prevented by liquid shields 16, 16' at the ball bearings so that no liquid can escape from or splash out of the cylinder, as would be the case in the form of viscous damper shown in my aforesaid application. Also, no north-south shift of the liquid can occur in my new form of damper to disturb the balance of the compass. The broad principle of my invention is also obviously applicable to other forms of dampers and might well be applied to the gimbal dampers on gyro instruments used for suppressing the swinging of the compass in its gimbals or to the viscous dampers employed in gyroscopes of the type shown in the patent to Draper et al., No. 2,609,606, dated September 9, 1952.

For damping the oscillations of the compass about the meridian, I employ a magnetic damper similar in principle to that disclosed and claimed in my prior patents 2,510,068 dated June 6, 1950 for Gyro Compasses and 2,611,973, dated September 30, 1952 for Gyro Compasses. In my present invention, I have improved and simplified this type of damper for use in connection with a pendulum pivoted on the gyro case about the spin axis of the gyro, while in my prior patent this type of magnetic damper is shown as applied to top heavy types of "pendulums," pivoted below the spin axis of the gyro case. According to my present invention, I also employ the same pendulum which imparts meridian seeking properties to the compass for also effecting the damping. For the above purposes, I have shown secured to the pendulum 6 a laterally extending arm 20 which extends beyond and partially around the gyro case 5 and between the vertical ring 3 and phantom ring 1. This arm carries the armature 21 of a two-part magnetic device, the magnetized or permanent magnet 22 being shown as secured to the follow-up or vertical ring 1. Both the magnet 22 and armature 21 are positioned along the horizontal axis 4 about which case 5 is pivoted in vertical ring 3.

It will be seen therefore that any relative tilt between the gyro case 5 and the pendulum 6 will result in relative displacement of the pendulum 6 and gyro case 5 in the north-south direction and therefore displaces armature 21 from its normally aligned position with the permanent magnet 22. Therefore, a torque or couple will be exerted about the vertical axis of the compass upon such relative tilt in a direction to reduce the tilt which is the criterion for a gyro compass damper.

This invention also retains the advantage of my prior patents, that the attraction between the magnet 22 and armature 21 is reduced upon relative displacement of said parts greater than the normal amount due to tilt upon deviation from the meridian. As a result the damping couple is reduced during changes of speed or course of the craft which usually causes a greater relative tilt of the pendulum and gyro than meridional oscillations. Undesirable oscillations of the pendulum 6 during rolling and pitching of the craft are suppressed by the viscous damper 13, thus avoiding quadrantal errors.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyro compass, a rotor case, pendulous means pivoted thereon for imparting meridian seeking properties to the compass, a damper between said pendulous means and rotor case for reducing rolling errors while retaining ballistic deflection comprising a member secured to one of said case or pendulous means along its axis of suspension, a hollow container surrounding said member secured to the other of said case or pendulous means having a part mounted in complementary relation to said member, and a viscous liquid filling the container, the materials of said member and part and the liquid being so chosen that the clearance between the two is decreased upon temperature rise in the same ratio as the viscosity of the liquid falls under the same conditions.

2. In a gyro compass, a rotor case, pendulous means pivoted thereon for imparting meridian seeking properties to the compass, a damper between said pendulous means and rotor case for reducing rolling errors while retaining ballistic deflection comprising a conical member secured to one of said case or pendulous means along its axis of suspension, a hollow container surrounding said member and secured to the other of said case or pendulous means having a tapered sleeve mounted in complementary relation to said conical member, a viscous liquid filling the container, the materials of said member and sleeve and the liquid being so chosen that the clearance between the two is decreased upon temperature rise in the same ratio as the viscosity of the liquid falls under the same conditions, and means for adjusting the axial relation between said conical member and tapered sleeve.

3. A gyroscopic instrument having a stable element, a pendulum pivoted thereon, a damper between said pendulum and stable element comprising a member secured to one of said stable element or pendulum along its axis of suspension, a hollow container surrounding said member secured to the other of said stable element or pendulum and having a part mounted in complementary relation to the member, and a viscous liquid filling the container, the materials of said member and part and the liquid being so chosen that the clearance between the two is decreased upon temperature rise in the same ratio as the viscosity of the liquid falls under the same conditions.

4. An instrument as claimed in claim 3, in which the member is secured to the stable element and the container is secured to the pendulum.

5. A gyroscopic instrument having two relatively movable elements, the two elements having interfitting parts with a clearance therebetween in the form of an inner cone and an outer hollow conical surface spaced therefrom a predetermined amount, a viscous substance within said clearance selected to produce a predetermined viscous drag between said parts at a predetermined ambient temperature to produce a predetermined delay or damping factor, said two parts being composed of materials of different coefficients of expansion such that the clearance between said parts is decreased upon temperature rise in the same proportion as the viscosity of the substance falls under like condition, whereby the viscous drag of the substance and the delay or damping factor remain at the predetermined value, and means for relatively adjusting said cone and surface axially to vary the spacing therebetween.

6. In a gyro compass, a rotor case, a pendulous device pivoted thereon for imparting meridian seeking properties thereon to the compass without introducing rolling error, a viscous damper between said pendulous means and rotor case comprising a member secured to one of said case or pendulous means along the axis of suspension, a hollow container surrounding said member secured to the other of said case or pendulous means having a part mounted in complementary relation to said member to provide a clearance space, and a viscous substance within said space, the materials of said member, part and said substance being so chosen that the clearance between the two is decreased upon temperature rise in the same ratio as the viscosity of the liquid falls under the same conditions whereby the lag of the pendulous means in response to acceleration forces remains substantially constant.

7. In a gyro compass for dirigible craft, a follow-up element, a ring having a vertical axis, a rotor case pivoted about a horizontal axis in said ring, a pendulum pivoted on said case above said horizontal axis for imparting both meridian seeking and damping properties thereto, and a two-part magnetic device having a first part secured to said pendulum normally in line with said horizontal axis and a second part attracted toward the first part and fixed to said follow-up element, whereby a couple around the vertial axis is exerted upon relative tilt of said case and pendulum to decrease the tilt and thereby damp the compass, which couple decreases with excessive relative tilt of said pendulum and case thereby reducing the damping action during changes in speed or course of the craft.

References Cited in the file of this patent

UNITED STATES PATENTS

| | | |
|---|---|---|
| 2,013,109 | Reynolds | Sept. 3, 1935 |
| 2,080,279 | Kellogg | May 11, 1937 |
| 2,094,095 | Collins | Sept. 28, 1937 |
| 2,158,048 | Braddon | May 9, 1939 |
| 2,510,068 | Carter | June 6, 1950 |
| 2,667,078 | Baecher | Jan. 26, 1954 |